US012576575B2

(12) United States Patent
Chimetto et al.

(10) Patent No.: US 12,576,575 B2
(45) Date of Patent: Mar. 17, 2026

(54) BOTTLE-FORMING PREFORM WITH A MULTILAYERED WALL, AND GASEOUS BEVERAGE BOTTLE OBTAINED WITH SUCH A PREFORM

(71) Applicant: SOCIETE DES PRODUITS NESTLE S.A., Vevey (CH)

(72) Inventors: Fabio Chimetto, Piazzola sul Brenta (IT); Mathieu Begard, Remoncourt (FR)

(73) Assignee: Societe des Produits Nestle S.A., Vevey (CH)

( * ) Notice: Subject to any disclaimer, the term of this patent is extended or adjusted under 35 U.S.C. 154(b) by 124 days.

(21) Appl. No.: 18/579,061

(22) PCT Filed: Jul. 12, 2022

(86) PCT No.: PCT/EP2022/069374
§ 371 (c)(1),
(2) Date: Jan. 12, 2024

(87) PCT Pub. No.: WO2023/285413
PCT Pub. Date: Jan. 19, 2023

(65) Prior Publication Data
US 2024/0351266 A1 Oct. 24, 2024

(30) Foreign Application Priority Data
Jul. 16, 2021 (EP) ..................................... 21186056

(51) Int. Cl.
*B29C 49/00* (2006.01)
*B65D 1/02* (2006.01)
(Continued)

(52) U.S. Cl.
CPC .......... *B29C 49/071* (2022.05); *B65D 1/0215* (2013.01); *B29C 2949/0715* (2022.05);
(Continued)

(58) Field of Classification Search
None
See application file for complete search history.

(56) References Cited

U.S. PATENT DOCUMENTS

| | | | |
|---|---|---|---|
| 6,596,213 B2 | 7/2003 | Swenson | |
| 9,956,707 B2 | 5/2018 | Chiba et al. | |
| | (Continued) | | |

FOREIGN PATENT DOCUMENTS

| | | |
|---|---|---|
| JP | H05309649 A | 11/1993 |
| JP | 2008100439 | 5/2008 |
| | (Continued) | |

OTHER PUBLICATIONS

European Office Action for Appl No. 22 748 338.5 1014 dated Jul. 8, 2025, 16 pages.

*Primary Examiner* — James C Yager
(74) *Attorney, Agent, or Firm* — K&L Gates LLP

(57) ABSTRACT

The invention concerns a preform (10) for forming a bottle for gaseous beverage, the preform comprising a multilayered wall obtained by injection in a mould from an injecting point (22) located at a central bottom end of the preform, the multilayered wall including an inner layer (24), an outer layer (26) and a gasbarrier layer (28) sandwiched between the inner and outer layer. The gas barrier layer (26) advantageously extends along the entire preform multilayered wall except for a bottom ending portion (30), this bottom ending portion free of barrier layer (30) being a central part of a base-forming portion (20) delimited by a solid angle (α) comprised between 5° to 80°, the apex (C) of this solid angle being the centre of a semi-spherical lower segment of the base-forming portion (20). A bottle obtained by blow-moulding such a preform has a bottom ending portion free of barrier layer within a solid angle comprised between 5° and 50°.

6 Claims, 3 Drawing Sheets

(51) Int. Cl.
B29K 67/00           (2006.01)
B29L 31/00           (2006.01)

(52) U.S. Cl.
CPC ................. *B29C 2949/3016* (2022.05); *B29C
2949/3022* (2022.05); *B29C 2949/3036*
(2022.05); *B29K 2067/003* (2013.01); *B29K
2995/0067* (2013.01); *B29L 2031/7158*
(2013.01)

(56)                    References Cited

U.S. PATENT DOCUMENTS

| | | | |
|---|---|---|---|
| 2004/0146675 | A1 | 7/2004 | Hashimoto et al. |
| 2009/0269526 | A1 | 10/2009 | Sato et al. |
| 2016/0185488 | A1 | 6/2016 | Hosokoshiyama et al. |

FOREIGN PATENT DOCUMENTS

| | | | |
|---|---|---|---|
| JP | 4251350 | | 4/2009 |
| WO | 2022082297 | A1 | 4/2022 |

Fig. 3
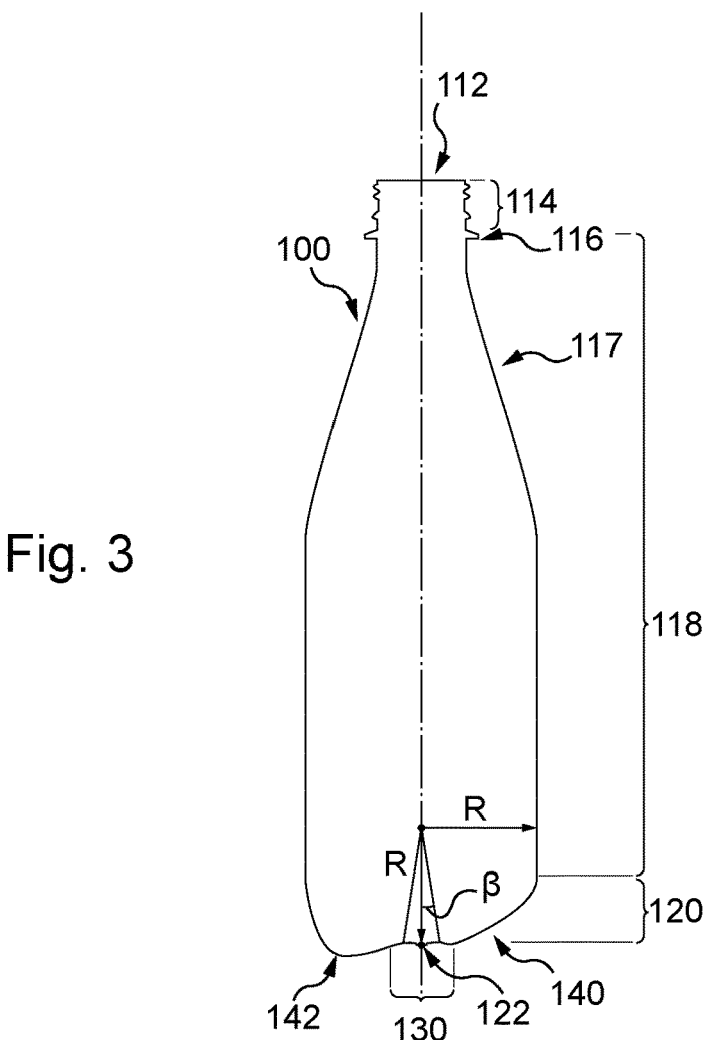
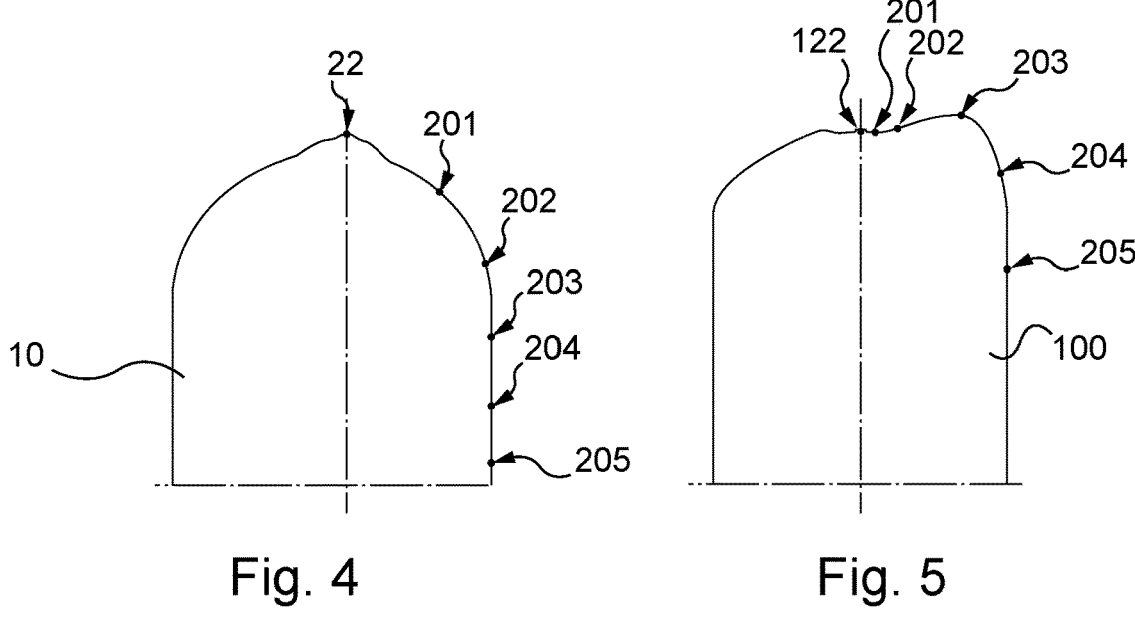
Fig. 4
Fig. 5

| Point N° | outer layer (µm) | Gas barrier layer (µm) | Inner layer (µm) |
|---|---|---|---|
| 205 | 219 | 21 | 58 |
| 204 | 195 | 19 | 46 |
| 203 | 175 | 14 | 43 |
| 202 | 281 | 0 | 61 |
| 201 | 461 | 0 | 226 |

Fig. 6

BOTTLE-FORMING PREFORM WITH A MULTILAYERED WALL, AND GASEOUS BEVERAGE BOTTLE OBTAINED WITH SUCH A PREFORM

CROSS REFERENCE TO RELATED APPLICATIONS

The present application is a National Stage of International Application No. PCT/EP2022/069374, filed on Jul. 12, 2022, which claims priority to European Patent Application No. 21186056.4, filed on Jul. 16, 2021, the entire contents of which are being incorporated herein by reference.

FIELD OF THE INVENTION

The invention deals with polymer-based preforms used to form gaseous beverage containers, in particular carbonated beverage bottles such as sparkling water bottles. More particularly, the invention deals with gaseous beverage bottle-forming preforms having a multilayered wall which includes a gas barrier layer.

BACKGROUND OF THE INVENTION

Polyethylene terephthalate (PET) containers have been widely used for packaging gaseous soft drinks, juice, water, and other beverages due to its combination of clarity and good mechanical properties.

However, the relative susceptibility of PET to permeation by oxygen and carbon dioxide limits its application as for smaller sized packages, as well as for the packaging of oxygen sensitive products. More generally, the insufficient impermeability of PET to $CO_2$ reduces the shelf-life of gaseous products.

Various technologies have been developed to enhance the barrier of PET against the permeation of small gas molecules.

One of these technologies consists in providing multilayered containers with a high gas barrier material sandwiched between two or more PET layers.

It is known to use nylon (MXD6) as the gas barrier material. This material raises two main issues: PET multilayer containers containing nylon can develop yellowness and haze once recycled; moreover, such a multilayered container is hard even impossible to recycle. Besides, nylon is about to become limited even forbidden in beverage containers in some countries.

To overcome these issues, it has been proposed to replace the nylon barrier by a PEF-based barrier, where PEF means polyethylene 2,5-furandicarboxylate. Such a method is disclosed by WO2016130748.

This does not degrade the PET, nor does it substantially impact the PET stretch ratio, meaning the existing equipment and methods can be utilized in fabricating the containers by blow moulding a preform. It was also found that the container design and methods do not negatively affect the clarity of the PET bottle or container.

Actually, the main advantage of using PEF in a multilayered preform or beverage container essentially made of PET is that PEF is compatible with PET, since both are polyester (whereas nylon is a polyamide).

But the use of PEF raises other issuers. In particular, the most important drawback in using PEF in a multilayered bottle or preform for gaseous beverage is that this material is not yet available at industrial scale whereby not only this material is still very expensive but also supplying issues may occur.

SUMMARY OF THE INVENTION

The object of the invention is to provide a new gaseous beverage bottle-forming multilayered preform which can be obtained by known industrial methods at reduced production costs, while providing at least the same level of barrier performance and shelf-life as known multilayered PET containers and preforms. Another object of the invention is to provide a multilayered preform the manufacture of which is less likely to be limited because of supplying issues.

To this end, the invention proposes a preform for forming a bottle for gaseous beverage, the preform comprising a multilayered wall obtained by injection in a mould from an injecting point located at a bottom end of the preform, the multilayered wall defining, from an open top end to the closed bottom end of the preform along a main axis of the preform:

a neck finish portion,
a body-forming portion configured to form a body portion of the bottle,
a base-forming portion configured to form a base portion of the bottle, the base forming-portion having a lower segment which is globally semi-spherical, wherein the multilayered wall includes:

an inner layer having an inner face intended to form the gaseous beverage side of the bottle,
an outer layer having an outer face intended to form the outside of the bottle,
a gas barrier layer sandwiched between the inner layer and the outer layer.

The preform according to the invention is characterized in that the gas barrier layer extends along the entire preform multilayered wall except for a bottom ending portion which is free of gas barrier layer, this bottom ending portion free of gas barrier layer being a central part of the base-forming portion extending around the injecting point in a solid angle comprised between 5° to 80°, the apex of this solid angle being the centre of the globally semi-spherical lower segment of the base-forming portion.

As will be seen later, the invention also extends to a bottle obtained by blow-moulding a preform according to the invention. The preform according to the invention is manufactured in a conventional way, that is to say by injection in a mould. As usual, the injecting point, where the materials which constitute the various layers of the preform are successively injected (in a liquid or viscous form), is located on the main axis of the preform, at the centre of the bottom end of the preform. The bottom ending portion free of gas barrier layer then comprises and surrounds the injecting point.

The bottle is next manufactured in a conventional way by blowing the preform in a mould to cause the preform to expand. During this blowing phase, the material close to the injection point is difficult to stretch and is thus almost not elongated. Therefore, the region close to the injection point remains thicker than the rest of the bottle. The invention takes advantage of this feature. Indeed, the idea on the basis of the invention is that the higher thickness of the bottle wall at and close to the injecting point could compensate an absence of gas barrier layer at this point and in an area duly defined around this point.

As defined above, this area (that is to say the bottom ending portion free of barrier layer) is delimited by a solid angle comprised between 5° to 80°.

More precisely, in case where the preform is configured to form a gaseous beverage bottle having a volume (strictly) less than 50 cl, the solid angle delimiting the bottom ending portion free of gas barrier layer is preferably comprised between 5° to 80°.

In case where the preform is configured to form a gaseous beverage bottle having a volume comprised between 50 cl and 100 cl (including these two values), the solid angle delimiting the bottom ending portion free of gas barrier layer is preferably comprised between 5° to 70°.

In case where the preform is configured to form a gaseous beverage bottle having a volume (strictly) more than 100 cl, the solid angle delimiting the bottom ending portion free of gas barrier layer is preferably comprised between 5° to 60°.

According to a possible feature of the invention, the inner layer is made in a material selected in the group of PET-based polymers and copolymers. Likewise, the outer layer is made in a material selected in the group of PET-based polymers and copolymers.

Besides, the gas barrier layer is made in a material selected in the group of polymers or copolymers based on polyglycolic acid (PGA), 2,5-furandicarboxylate polyester including polyethylene 2,5-furandicarboxylate (PEF), poly (trimethylene furan-2,5-Dicarboxylate) (PTF), Poly(Neo-pentyl Glycol 2,5-Furanoate) (PNF), Polyethylene Naphtha-late (PEN), PEN/PET Co-Polymer; Polytrimethylene Naphthalate (PTN), polybutylene naphthalate (PBN); poly-acrylonitrile (PAN), nanoclay, MXD6 (Nylon); nano nylon-MXD6 and Polybutadiene mixtures.

Nevertheless, in case where the outer layer and the inner layers are made of PET, PEF-based or 2,5-furandicarbonate polyester-based polymers and copolymers are preferred for the gas barrier layer, since they are more compatible with PET.

Whatever the chosen material for the gas barrier layer, by providing a bottom ending portion free of gas barrier layer, the quantity of material used for the gas barrier layer is reduced thanks to the invention. This enables to choose PEF as the material for the gas barrier layer, with a limited extra cost and with a limited risk to encounter supplying problems.

The choice of PEF leads to a bottle easier to recycle, which is good for the planet. Nevertheless, even if another material is chosen for the gas barrier layer, a cost reduction may be achieved thanks to the invention compared with preforms having a gas barrier layer present in their whole multilayered wall.

According to a possible feature of the invention, a cumulated thickness of the inner layer and the outer layer at any point of the bottom ending portion free of gas barrier layer is higher than a cumulated thickness of the inner layer and the outer layer at any point of a junction between the lower hemispherical segment of the base-forming portion and an upper cylindrical segment of said base-forming portion.

More precisely, the cumulated thickness of the inner layer and the outer layer at any point of the bottom ending portion free of gas barrier layer may be at least 300 μm or 120% higher than the cumulated thickness of the inner layer and the outer layer at the junction between the lower hemispherical segment and the upper cylindrical segment of the base-forming portion.

According to a possible feature of the invention, the thickness of the multilayered wall of the preform at any point of the bottom ending portion free of gas barrier layer (which is the cumulated thickness of the inner layer and the outer layer) is higher than the thickness of the preform multilayered wall at the junction between the lower hemispherical segment and the upper cylindrical segment of the base-forming portion (that is to say, here, the cumulated thickness of the inner layer, the outer layer and moreover the gas barrier layer).

The invention extends to a bottle obtained from a preform according to the invention, using a usual blow-moulding process.

In other words, the invention extends to a gaseous beverage bottle comprising a multilayered wall which defines, from an open top end to a closed bottom end of the bottle along a main axis of the bottle:

a neck portion,
a body portion,
a base portion,
wherein the bottle multilayered wall includes:
an inner layer having an inner face intended to be in contact with the gaseous beverage,
an outer layer having an outer face forming the outside of the bottle,
a gas barrier layer sandwiched between the inner layer and the outer layer, The bottle according to the invention is characterized in that the gas barrier layer extends along the entire bottle multilayered wall except for a bottom ending portion which is free of gas barrier layer, this bottom ending portion free of gas barrier layer being a central part of the base portion which is delimited by a solid angle comprised between 5° to 50°, the apex of this solid angle being situated on the main axis of the bottle at a distance from the inner face along said main axis equal to a maximum radius of the body portion.

According to a possible feature of the invention, the bottom ending portion free of gas barrier layer in the bottle has a thickness which is more than 10% of a reference thickness, the rest of the bottle multilayered wall in the base portion having a thickness which is less than or equal to 10% of the reference thickness, the reference thickness being the thickness at any point of the base portion situated at 3 mm from the main axis of the bottle. In other words, following a centrifugal (outward) direction from the main axis of the bottle, the bottom ending portion free of gas barrier layer ends where the thickness of the bottle multilayered wall becomes less than 10% of the reference thickness. Otherwise said, following a centripetal (inward) direction, the bottom ending portion free of gas barrier layer begins where the thickness of the bottle multilayered wall becomes more than 10% of the reference thickness. At this distance from the main axis of the bottle, the cumulated thickness of the outer and inner layers is sufficient to compensate an absence of gas barrier layer.

According to a feature of the invention, the thickness of the bottle multilayered wall at any point of the bottom ending portion free of gas barrier layer of the bottle is higher than a thickness of the bottle multilayered wall at any point of the junction between the base portion and the body portion of the bottle.

A mould used for obtaining a bottle by blow-moulding is usually composed of three parts: a bottom moulding part where the base portion of the bottle is formed, and two symmetric lateral moulding parts (also called shells) where the body-portion is formed. Once the bottle is blown up, to unmould the bottle, the two lateral moulding parts are removed in opposite radial directions whereas the bottom moulding part is removed in the axial direction (downwardly). The junction between the body portion and the base portion of a bottle corresponds to the junction between the lateral moulding parts and the bottom moulding part of the mould where the bottle was blown up.

BRIEF DESCRIPTION OF THE DRAWINGS

Additional features and advantages of the present invention are described in, and will be apparent from, the description of the presently preferred embodiments which are set out below with reference to the drawings in which:

FIG. 3 is a schematic cross-section of a bottle according to the invention, the left part of the figure showing a foot of the bottle whereas the right part of the figure shows a valley;

FIG. 4 represents a profile of a bottom part of a preform according to the invention;

FIG. 5 represents a very schematic cross-section of a bottom part of the bottle obtained from the preform of FIG. 4, the left side of the figure showing a valley of the bottle whereas the right part of the figure shows a foot of the bottle;

FIG. 6 is a table listing the thicknesses of the various layers of the bottle multilayered wall of the bottle of FIG. 5.

DETAILED DESCRIPTION OF THE INVENTION

Figure 1:
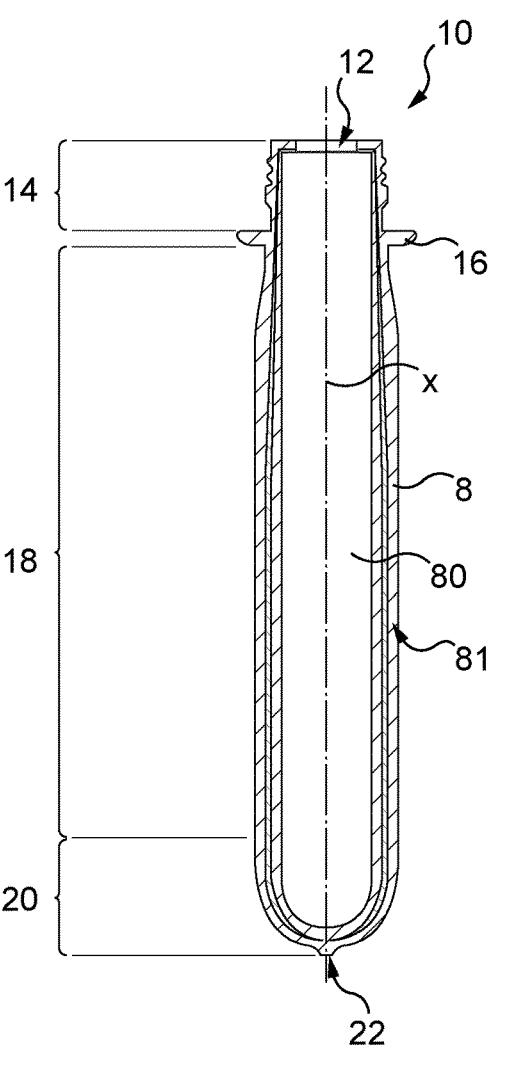
FIG. 1 represents a schematic longitudinal section of a preform according to the invention.
Figure 2:
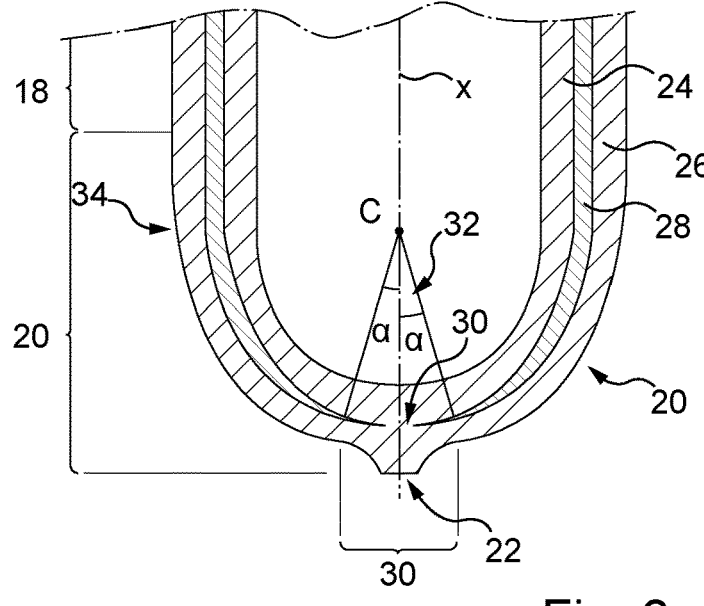
FIG. 2 represents a schematic longitudinal section of a bottom part of the preform of FIG. 1.

FIGS. 1 and 2 show an embodiment of a preform for forming a gaseous beverage bottle according to the invention.

In a usual way, this preform 10 is essentially composed of a multilayered wall 8, having an inner face 80 intended to form the beverage side of a bottle and an outer face 81 intended to form the outside of the bottle. The preform 10 is rotationally symmetrical around a main axis X and comprises, from top to bottom:

an open end 12,
a neck finish portion 14, having a threaded peripheral outer face,
a flange 16,
a body-forming portion 18, where the inner face 80 of the multilayered wall 8 is cylindrical,
a base-forming portion 20, which includes an upper segment where the inner face 80 is still cylindrical and a lower segment where the inner face 80 is semi-spherical,
a bottom end 22 corresponding to the injecting point where the various layers of the multilayered wall 8 are injected in a mould (not shown) to obtain the preform.

The multilayered wall 8 of the preform comprises (see FIG. 2) along a centrifugal direction, an inner layer 24 preferably in PET, a gas barrier layer 28 preferably in PEF, and an outer layer 26 preferably in PET.

According to the invention, the gas barrier layer 28 is present in the whole multilayered wall 8 (in particular, the gas barrier layer 28 extends along the whole body-forming portion 18) excepted for a bottom ending portion free of gas barrier layer 30. This bottom ending portion free of gas barrier layer 30 is a central part of the base-forming portion 20 extending inside a cone (or solid angle) 32 whose top C is the centre of the lower hemispherical segment of the base-forming portion 20. This cone 32 has an angle $\alpha$ comprised between 5° and 80°, depending on the volume of the bottle to be formed. For a bottle having a volume less than 50 cl, for example equal to 33 cl or 25 cl, the angle $\alpha$ is preferably comprised between 5° and 80°. For a bottle having a volume between 50 cl and 100 cl, for example equal to 50 cl or 75 cl or 100 cl, the angle $\alpha$ is preferably comprised between 5° and 70°. For a bottle having a volume more than 100 cl, for example equal to 1.5 l or 2 l, the angle $\alpha$ is preferably comprised between 5° and 60°.

As better shown at FIG. 2, the injection point 22 of the preform multilayered wall 8 is located at the bottom of the preform, on the central axis of the preform. The preform of FIGS. 1 and 2 is used to form a bottle such as the one illustrated at FIGS. 3 and 5, by blow moulding the preform, that is to say by expanding the preform in the axial direction and in a hoop direction by blowing the preform in an appropriate mould.

In a usual way, this bottle illustrated at FIGS. 3 and 5 comprises, from top to bottom along its main axis X:

an open end 112,
a neck portion 114 intended to receive a threaded cap, the neck portion having a threaded peripheral external face corresponding to the threaded cap,
a flange 116, intended to abut and close the open bottom end of the threaded cap; it can be noted that the open end 112, the neck portion 114 and the flange 116 of the bottle 100 have the same shape and dimensions as the open end 12, the neck finish portion 14 and the flange 16 of the preform since these parts are not expected to expand during the blow moulding,
a body portion 118, which is derived from the expansion of the body-forming portion 18 of the preform 10; in the illustrated embodiment, the body portion 118 includes a conical shoulder portion 117;
a base portion 120 derived from the expansion of the base-forming portion 20 of the preform 10; in the illustrated embodiment, the base portion 120 alternately comprises valleys 140 and feet 142 around the main axis X,
the central point 122 of the bottom end of the bottle corresponds to the injecting point 22 of the preform.

The bottle multilayered wall is composed of at least three layers (not shown in the figures), namely an inner layer, an outer layer and a gas barrier layer, corresponding to the inner layer 24, the outer layer 26 and the gas barrier layer 28 of the preform. The inner layer has an internal face which is intended to be in contact with the gaseous beverage; the outer layer has an external face forming the outside of the bottle; the gas barrier layer is sandwiched between the inner layer and the outer layer.

According to the invention, the base-portion 120 includes a bottom ending portion free of barrier layer 130, which extends in a solid angle $\beta$ which is comprised between 5° and 50°, depending on the volume of the bottle. For a bottle having a volume less than 50 cl, for example equal to 33 cl, the angle $\beta$ is preferably comprised between 5° and 50° For a bottle having a volume between 50 cl and 100 cl, for example equal to 50 cl or 75 cl or 100 cl, the angle $\beta$ is preferably comprised between 5° and 40°. For a bottle having a volume more than 100 cl, for example equal to 1.5 l or 2 l, the angle $\beta$ is preferably comprised between 5° and 30°.

FIG. 4 and FIG. 5 respectively show a bottom part of the preform 10 and the corresponding bottom part of the bottle 100 (being specified that the considered bottle has a volume of 50 cl). Of course, these two figures are not presented at scale, the preform being blown to form the bottle.

These two figures illustrate various points 201-205 on the preform 10 and their corresponding points 201-205 on a foot 142 of the bottle 100. By way of example, the thickness in μm of the various layers of the bottle multilayered wall are reported in the table of FIG. 6. The points 201-205 are schematically indicated for general understanding but their position may vary (especially in the bottle) due to the stretching and blowing occurred to form the bottle from the preform.

It can easily be understood and observed from FIG. 4, 5 and from the table of FIG. 6 that the preform multilayered wall is more stretched by the blow-moulding in the area between points 203 and 205 than in the area between points 122 and 202, whereby the bottle multilayered wall is thinner in the area 203-205 than in the area 122-202.

According to the invention, any point between the points 122 and 202 is in the bottom ending portion free of gas barrier 130. In this portion, the thickness of the outer and inner layers is more than that of the outer and inner layers at point 202 (that is to say more than 281 μm and 61 μm respectively). In other words, the thickness of the outer layer and the inner layer keeps on increasing from point 202 until point 122, in this area where there is no gas barrier layer.

The inventors have surprisingly observed that no significant gas leakage occurs in the bottom ending portion free of gas barrier 130 in a bottle obtained according to the invention. Despite the absence of gas barrier in that portion, the shelf-life of the bottle according to the invention is not degraded compared with a bottle obtained with a preform having the same specifications in terms of thickness and composition of the inner and outer layer but having a gas barrier layer which extends in the whole preform multilayered wall.

The absence of gas barrier in the bottom ending portion free of gas barrier 30 or 130 saves a quantity of PEF or nylon (or other material used for making such a gas barrier) which may seem low at the level of a single bottle but which becomes significant even important with respect to the number of bottles produced every year.

The cumulated thickness of the outer and inner layers at any point in the bottom ending portion free of gas barrier 130 of the bottle is more than the cumulated thickness of the outer and inner layers at point 202 (that is to say more than 281+61=342 μm). The junction between the body portion and the base portion of the bottle is between points 204 and 205. At any point of this junction, the thickness of the bottle multilayered wall is between the thickness of point 204 (which is 195+19+46=260 μm) and the thickness of point 205 (which is 219+21+58=298 μm). Therefore, the thickness of the bottle multilayered wall at any point of the bottom ending portion free of barrier layer 130 is much higher than the thickness of the bottle multilayered wall at any point of the junction between the base portion 120 and the body portion 118 of the bottle. In the illustrated example, the difference between the thickness of the bottle multilayered wall at the bottom ending portion free of barrier layer and the thickness of the bottle multilayered wall at the junction between the base portion and the body portion of the bottle is thus more than 44 μm (=342−298).

The inventors demonstrated that the higher thickness of the bottle multilayered wall at the bottom ending portion free of gas barrier 130 is sufficient to compensate the absence of gas barrier in the bottom ending portion free of gas barrier.

It should be understood that various changes and modifications to the presently preferred embodiments described herein will be apparent to those skilled in the art. Such changes and modifications can be made without departing from the scope of the present invention and without diminishing its attendant advantages. It is therefore intended that such changes and modifications be covered by the appended claims.

The invention claimed is:

1. Preform for forming a bottle for gaseous beverage, the preform comprising a preform multilayered wall obtained by injection in a mould from an injecting point located at a bottom end of the preform, the multilayered wall defining, from an open top end to a closed bottom end of the preform along a main axis of the preform:
    a neck finish portion,
    a body-forming portion configured to form a body portion of the bottle,
    a base-forming portion configured to form a base portion of the bottle, the base forming-portion having a lower segment which is globally semi-spherical,
    wherein the preform multilayered wall includes:
    an inner layer having an inner face intended to form the gaseous beverage side of the bottle,
    an outer layer having an outer face intended to form the outside of the bottle,
    a gas barrier layer sandwiched between the inner layer and the outer layer,
    the gas barrier layer extends along the entire preform multilayered wall except for a bottom ending portion which is free of barrier layer, this bottom ending portion free of barrier layer being a central part of the base-forming portion extending around the injecting point in a solid angle (α) comprised between 5° to 80°, the apex of this solid angle being the centre of the globally semi-spherical lower segment of the base-forming portion.

2. Preform according to claim 1, wherein the inner layer is made of a material selected from the group consisting of PET-based polymers and copolymers, where PET means polyethylene terephthalate, the outer layer is made of a material selected from the group consisting of PET-based polymers and copolymers, and the gas barrier layer is made of a material selected from the group consisting of polymers or copolymers based on polyglycolic acid (PGA), 2,5-furandicarbonate polyester including polyethylene 2,5-furandicarboxylate (PEF), poly (trimethylene furan-2,5-Di-carboxylate) (PTF), Poly (Neopentyl Glycol 2,5-Furanoate) (PNF), Polyethylene Naphthalate (PEN), PEN/PET Co-Polymer, Polytrimethylene Naphthalate (PTN), polybutylene naphthalate (PBN); polyacrylonitrile (PAN), nanoclay, MXD6 (Nylon); nano nylon-MXD6 and Polybutadiene mixtures.

3. Preform according to claim 1, wherein the preform is configured to form a gaseous beverage bottle having a volume less than 50 cl and the solid angle (α) delimiting the bottom ending portion free of barrier layer is comprised between 5° to 80°.

4. Preform according to claim 1, wherein the preform is configured to form a gaseous beverage bottle having a volume comprised between 50 cl and 100 cl and the solid angle (α) delimiting the bottom ending portion free of barrier layer is comprised between 5° to 70°.

5. Preform according to claim 1, wherein the preform is configured to form a gaseous beverage bottle having a volume more than 100 cl and the solid angle (α) delimiting the bottom ending portion free of barrier layer is comprised between 5° to 60°.

6. Preform according to any one of claim 1, wherein a cumulated thickness of the inner layer and the outer layer at any point of the bottom ending portion free of barrier layer is higher than a cumulated thickness of the inner layer and the outer layer at any point of a junction between the lower hemispherical segment of the base-forming portion and an upper cylindrical segment of said base-forming portion.

* * * * *